United States Patent [19]

Hetherington

[11] Patent Number: 5,077,932
[45] Date of Patent: Jan. 7, 1992

[54] WATER AERATION APPARATUS

[76] Inventor: Robert P. Hetherington, 9714 Honeysuckle Ave., Palm Beach Gardens, Fla. 33410

[21] Appl. No.: 544,411
[22] Filed: Jun. 27, 1990
[51] Int. Cl.[5] .............................................. A01K 97/04
[52] U.S. Cl. ..................................... 43/57; 261/121.2
[58] Field of Search .............................. 43/55, 56, 57; 261/121.2

[56] References Cited

U.S. PATENT DOCUMENTS

| | | | |
|---|---|---|---|
| 2,187,746 | 4/1938 | Lefevre . | |
| 2,193,934 | 3/1940 | Moores . | |
| 2,194,037 | 3/1940 | Thuma | 43/56 |
| 2,590,581 | 3/1952 | Shirley | 261/121.2 |
| 2,641,455 | 6/1953 | Poirat | 261/121.2 |
| 2,865,618 | 12/1958 | Abell | 43/57 |
| 2,998,671 | 9/1961 | Hinton | 43/57 |
| 3,189,334 | 6/1965 | Bell | 43/57 |
| 3,323,249 | 6/1967 | Randall | 43/57 |
| 3,333,834 | 8/1967 | Brewster . | |
| 3,374,990 | 3/1968 | Gray | 43/57 |
| 3,575,350 | 4/1971 | Willinger . | |
| 3,643,403 | 2/1972 | Speece . | |
| 4,166,086 | 8/1979 | Wright . | |
| 4,488,508 | 12/1984 | Heideman . | |
| 4,522,151 | 6/1985 | Arbisi et al. . | |
| 4,710,324 | 12/1987 | Vesnaver . | |
| 4,817,561 | 4/1989 | Byrne et al. . | |

Primary Examiner—Kurt Rowan
Assistant Examiner—James Miner
Attorney, Agent, or Firm—Eckert Seamans Cherin & Mellott

[57] ABSTRACT

Apparatus for aerating water includes a water accelerator generally in the form of a propeller, and a motor for rotating the accelerator. An airway delivers small amounts of air to an onlet on a water intake side of the accelerator. Rotation of the accelerator draws air from the airway outlet and disperses the air into the water. The accelerator and the airway outlet are preferably located in a housing having a water inlet for supplying water to the intake side of the accelerator, and a water outlet providing for the exhaust of aerated water leaving the accelerator.

4 Claims, 5 Drawing Sheets

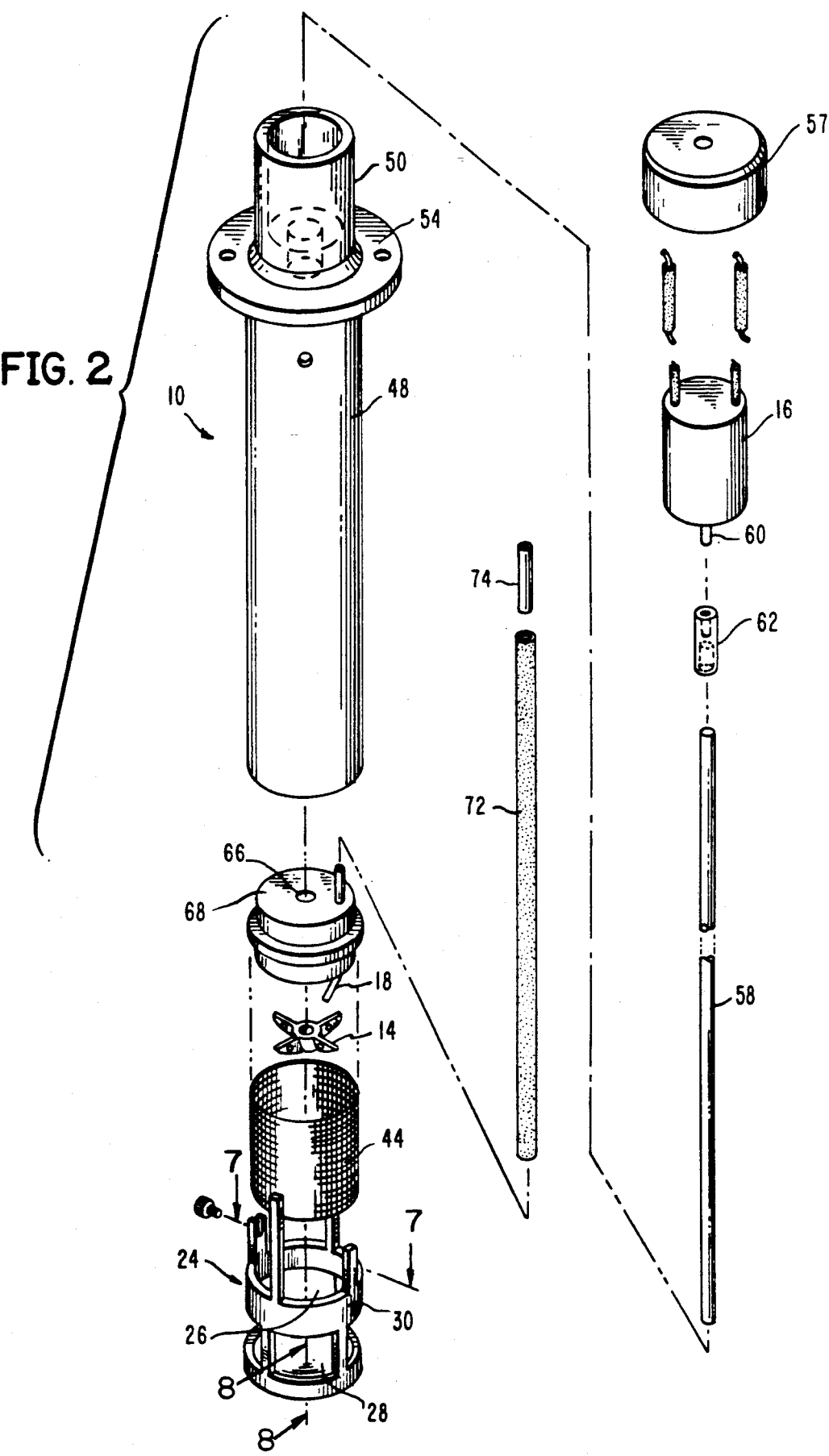

WATER AERATION APPARATUS

BACKGROUND OF THE INVENTION

1. Field of the Invention

This invention relates generally to water aeration apparatus, and more particularly to apparatus for aerating water in order to sustain marine life.

2. Description of the Prior Art

The maintenance of proper oxygen levels in water is essential to the viability of marine life in the water. Fishermen, for example, often struggle to keep bait alive over extended periods of time. Aeration is sometimes provided by submersing a bucket containing the bait into water available in the natural environment, which water flows through apertures in the bucket to maintain necessary oxygen levels within the bucket. This method requires tedious removal and replacement of the bait bucket each time new bait is required, and does not permit transport of the bait and bucket, which must remain in the water in order to sustain the marine life.

Chemical products have been developed which dissolve and release oxygen into the water, or agitate the water to facilitate the introduction of air from the atmosphere. These tablets do not provide aeration for extended periods of time.

Pump devices have also been developed which pump air through an air stone to produce small bubbles. The pump typically hangs on the side of a water container and has a tube that extends into the water. The airstone is positioned at the end of the tube that is submersed in the water. Such pump systems require large amounts of energy in relation to the amount of aeration which is produced.

There remains a need for a water aeration apparatus which will disperse relatively large amounts of air into water containing marine life. It further would be desirable for such a device to be lightweight and portable. It also would be desirable if such a device would require relatively small amounts of energy, and at relatively low voltages, to facilitate the use of a portable power supply.

SUMMARY OF THE INVENTION

It is an object of the invention to provide aeration apparatus which will replenish oxygen levels in water in order to sustain marine life living in the water.

It is another object of the invention to provide a water aeration apparatus which will create large air to water surface areas to facilitate the transport of oxygen into the water.

It is an yet another object of the invention to provide water aeration apparatus which circulates water, and disperses air into the circulating water.

It is still another object of the invention to provide water aeration apparatus which is efficient in energy utilization.

It is another object of the invention to provide a water aeration apparatus which is light in weight, and thereby portable.

It is a further object of the invention to provide water aeration apparatus capable of operating on a low voltage power supply.

It is a further object of the invention to provide water aeration apparatus which can utilize a portable power supply.

It is still another object of the invention to provide a water aeration device which is relatively low in cost.

These and other objects are accomplished by water aeration apparatus having a water circulating accelerator generally in the form of a propeller, and an airway which delivers air to the suction side of the accelerator. In a preferred embodiment, the airway is a small conduit that extends from above the surface of the water to a point immediately behind the accelerator. Air from the surface is drawn through the conduit by a vacuum produced behind the rotating accelerator. A small amount of air is drawn by the accelerator relative to the much larger volume of water. The high-speed accelerator creates large turbulences and pressures causing the air to be broken into small bubbles and facilitating the transfer of oxygen into the water.

Agitation, turbulence and pressure are desired according to the invention in order to decrease the size of the aeration bubbles. Smaller air bubbles increase the surface area of air that is presented to the air/water interface for a given volume of air. Also, smaller air bubbles are slower to rise and thereby have greater contact time with the water.

A housing is preferably provided to shield the accelerator, which turns at high speeds, from the marine life and is also designed to regulate the flow of intake and exhaust water through intake and exhaust openings, respectively. Screening can be provided adjacent to the water intake and exhaust openings to exclude debris and to further break up air bubbles leaving the accelerator.

The accelerator preferably has blades with flat blade edge portions that are substantially perpendicular to the axis of rotation of the accelerator. This allows a flat blade surface to pass the outlet of the airway to draw air from the outlet. The airway preferably has an elliptical outlet which is placed over the widest part of the accelerator blades, where the draw of the accelerator is the greatest.

The apparatus is capable of operation on direct current and at voltages at or below 6 Volts DC, which permits the apparatus to operate on light weight batteries. This makes the apparatus more portable and reliable.

Apparatus according to the invention need not operate at all times to sustain marine life. A timing unit can be attached to create on and off cycles of operation. This reduction of unnecessary operating time extends both motor and battery life.

BRIEF DESCRIPTION OF THE DRAWINGS

There are shown in the drawings embodiments which are presently preferred, it being understood, however, that the invention is not limited to the precise arrangements and instrumentalities shown, wherein:

FIG. 2 is a an exploded perspective view.

DETAILED DESCRIPTION OF THE PREFERRED EMBODIMENT

Figure 1:
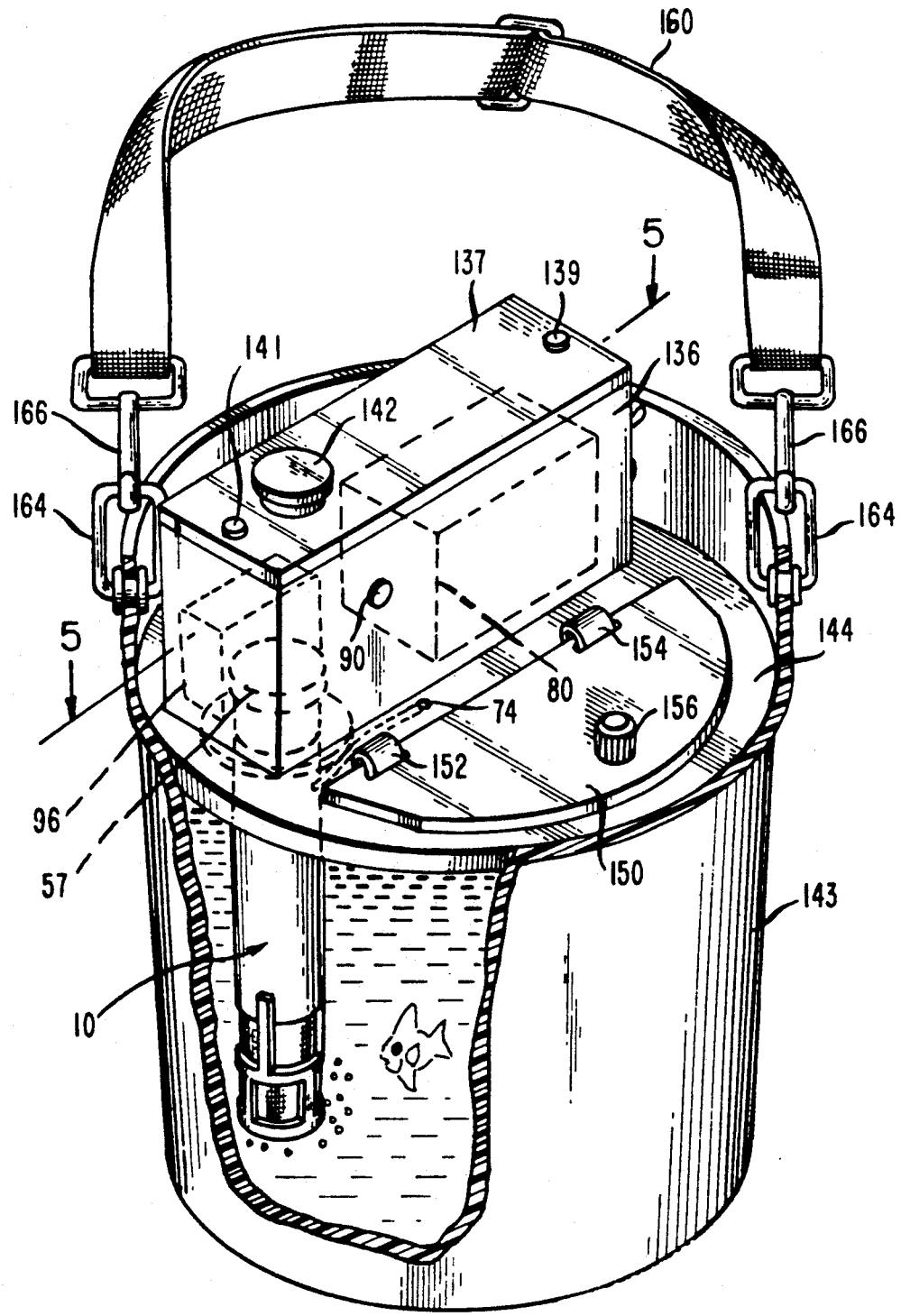
FIG. 1 is a front elevation, partially in section and partially in phantom, of a bait container including water aeration apparatus according to the invention.

As shown in the drawings, a preferred water aeration apparatus 10 according to the invention includes an accelerator 14 for circulating water. Means for driving the accelerator 14, such as the motor 16, are also provided. An airway 18 has an outlet 20 immediately adjacent to the water intake side of the accelerator 14. Rotation of the accelerator 14 will draw air from the airway 18, which air will be dispersed into the water by the rapidly-rotating accelerator 14.

Figure 9:
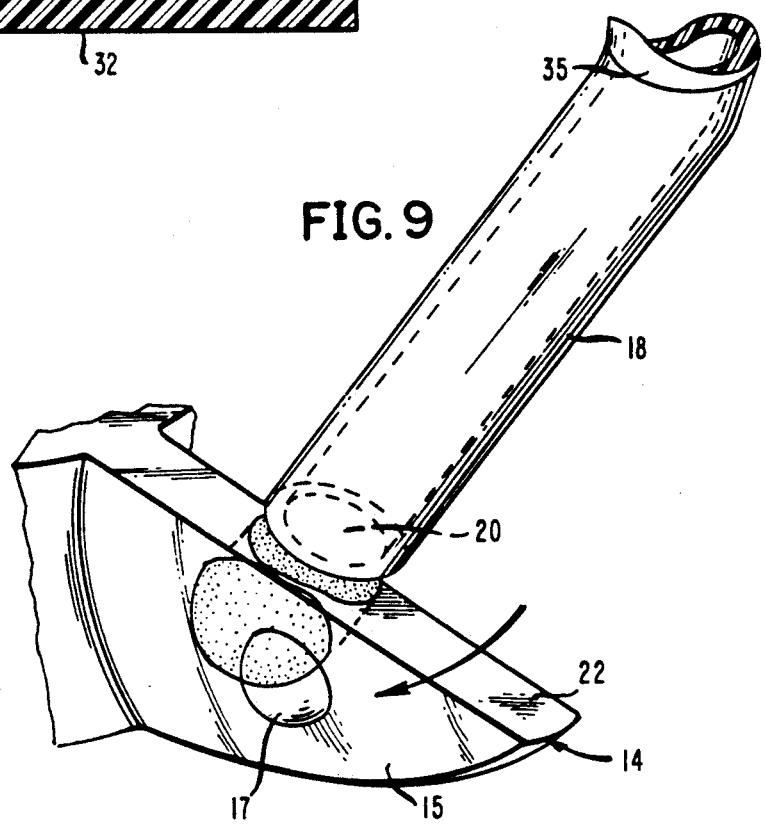
FIG. 9 is an enlarged perspective of an accelerator blade edge portion and an airway outlet.

The accelerator 14 is preferably in the general form of a propeller having at least two blades 15. The number, design and pitch of the blades can be varied. It is preferable that each blade has a flat blade edge portion 22 that is substantially perpendicular to the axis of rotation of the accelerator. The flat blade edge portion 22 of the accelerator is preferably located on the low pressure intake side of the accelerator, and is leading in the direction of rotation 20. The outlet of the airway 18 is positioned immediately adjacent the flat blade edge portion 22 such that this portion will pass immediately adjacent, and substantially parallel to, the outlet 20 to draw air from the opening (FIG. 9). The outlet 20 can be angled so as to be slightly elliptical, to facilitate the removal of air from the outlet 20.

At least one turbulence-inducing surface, such as the hemispherical surface portion 17, is preferably provided on at least one of the front or back face of each accelerator blade 15 to facilitate turbulence. The additional turbulence generated by such surfaces is believed to increase the dispersion of air into the water. Although any blade irregularity will provide the requisite turbulence, it is important that the irregularity does not produce undue vibrations. It is therefore desirable that any such irregularity be present on each side of the blades, and on all of the blades, to prevent unwanted vibrations. A hemispherical surface portion provided on each face of each blade is presently preferred to create desirable turbulence without undue vibrations.

Figure 4:
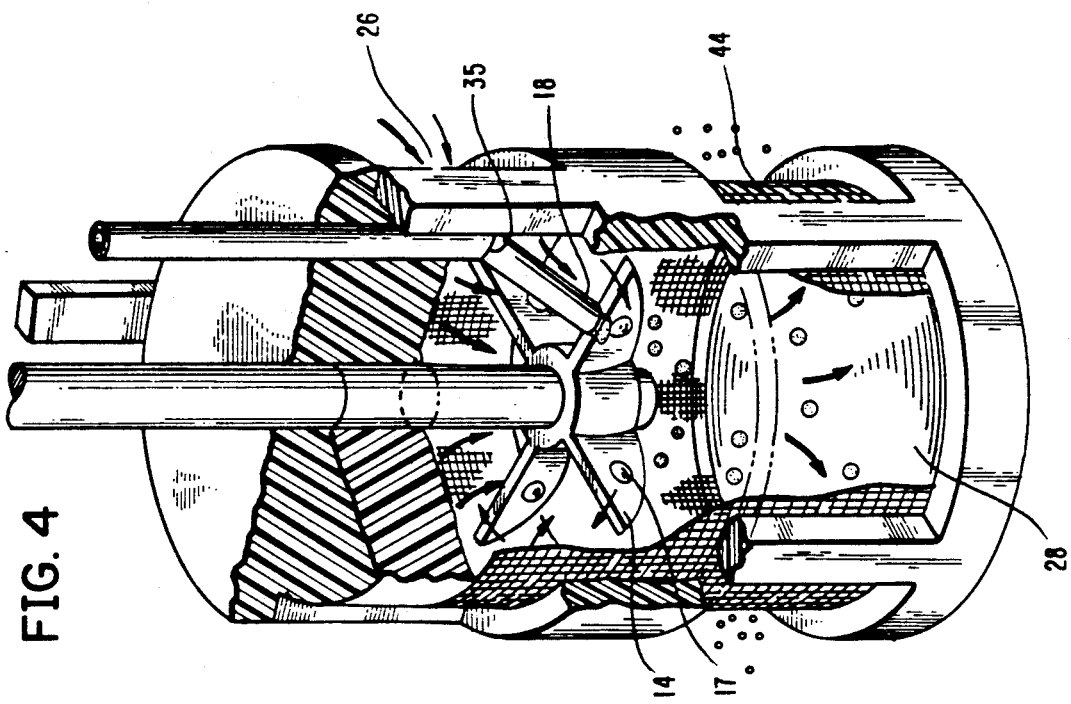
FIG. 4 is a perspective view, partially broken away and partially in section, depicting the operation of the accelerator assembly.
Figure 3:
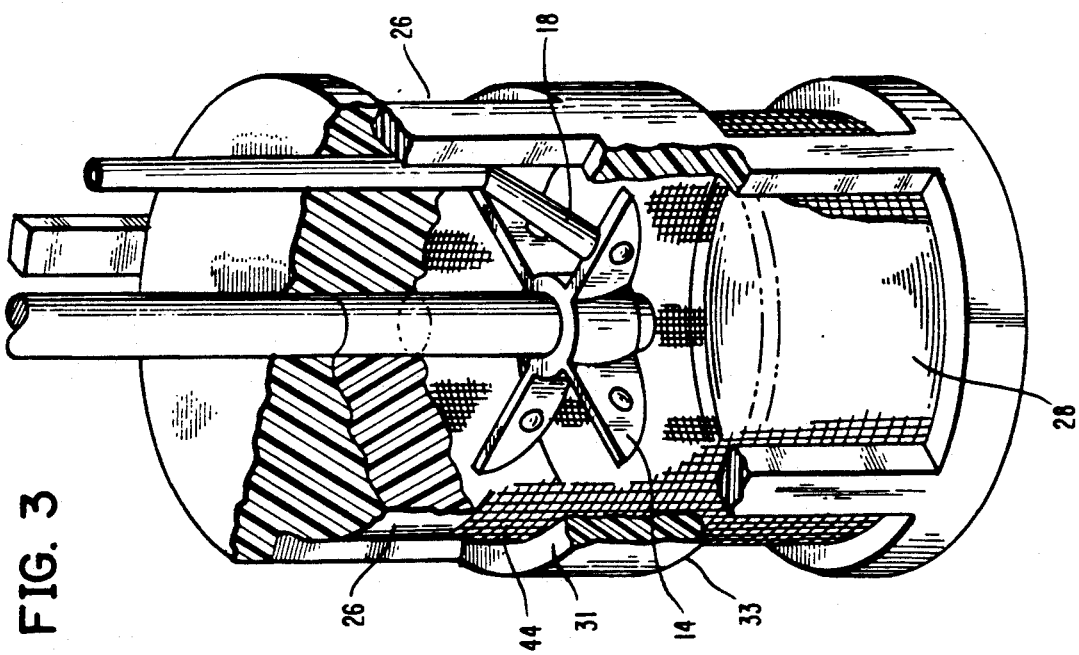
FIG. 3 is a perspective view, partially broken away and partially in section, of an accelerator assembly.
Figure 8:
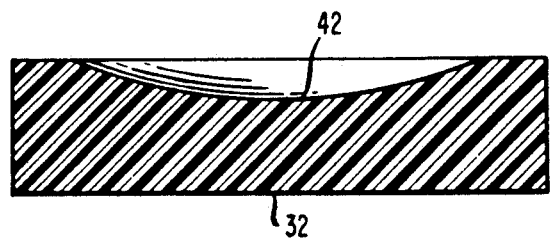
FIG. 8 is a cross section taken along line 8—8 in FIG. 2.

The accelerator 14 is preferably mounted within an enclosure 24 which protects the marine life from the accelerator blades 15, and controls the circulation of water to and from the accelerator 14. The enclosure 24 includes intake openings 26 and exhaust openings 28. An annular accelerator shield 30 is provided to channel the flow of water and air past the accelerator 14. A base plate 32 (FIG. 8) deflects the air-water mixture leaving the accelerator 14 through the exhaust openings 28. A concave depression 42 can be formed in at least a central, major portion of the base plate 32 to deflect water through the outlet openings 28 in the manner shown by the arrows in FIG. 4. The intake openings 26 and exhaust openings 28 can further be provided with a screen cover 44 which will prevent debris and marine life from entering the enclosure 24.

The inside diameter of the enclosure 24 is preferably at least 10% larger than the diameter of the accelerator 14, and not more than 30% greater than the diameter of the accelerator 14. The intake openings 26 preferably are between about 40-60% smaller than the exhaust openings 28. The height of the accelerator shield 30 must cover the entire height of the accelerator 14 and can be about 30% smaller in height, if desired. The upper blade edge portions 22 of the accelerator 14 should preferably be below the top edge 31 of the accelerator shield 30. The bottom, exhaust side of the accelerator 14 can extend below the bottom edge 33 of the accelerator shield 30 to facilitate the expulsion of water. This will limit the flow of water into the enclosure 24, which will facilitate the creation of a vacuum at a suction, intake side of the accelerator 14. This vacuum will draw air through the airway 18 such that the air will be dispersed into the circulating water.

The airway 18 is preferably positioned with the outlet 20 distanced from the accelerator 14 no more than the length of the inside diameter of the airway 18, and no less than about 50% of the length of this diameter to prevent interference with blade rotation. The outlet 20 is positioned adjacent the wide portion of the blades 15 for maximum draw against the outlet 20. Additionally, the airway 18 may be angled about 20-30 degrees from the vertical, as at a bend 35, which will angle the opening 20 relative to the axis of the airway 18 to create an elliptical opening adjacent the widest part of the blades 15 of the accelerator 14. Such a design will facilitate the withdrawal of air from the outlet 20 and contact of this air with the blades of the accelerator 14 and the circulating water.

The accelerator 14 and motor 16 can be conveniently located in a housing 48 which is preferably elongated so as to submerse the accelerator 14 a distance within the water. The motor 16 is preferably positioned within a motor enclosure 50 of the housing 48 at an end of the enclosure 48 substantially opposite to the accelerator 14. A detachable cap 57 can be utilized with the motor enclosure 48. A flange 54 can be provided by which to support the aeration apparatus on a suitable container lid, or other container or supporting structure. An accelerator drive shaft 58 can be utilized to connect the motor 16 to the accelerator 14. The drive shaft 58 is connected at one end to the shaft 60 of the motor 16 by a suitable coupling 62 and extends through a suitable aperture 66 of a bearing plate 68. The motor 16 will thereby not be immersed in the water, although alternative designs can be constructed wherein the motor 16 would be immersed but protected by suitable waterproofing materials.

The airway 18 can extend through a suitable aperture in the bearing plate 68 and can be connected to an air supply duct 72. The air supply duct 72 can be connected to an air tube 74 which preferably receives atmospheric air from the surrounding environment but which alternatively could be connected to an air or gas supply.

The motor 16 can be selected from any of several suitable motors, as the motor need not be of particularly high power. The motor 16 can be selected to operate on direct current, as supplied by a battery 80. The battery 80 will be adapted for the power requirements of the motor 16, but for small bait wells, can be as small as 1.5 volts.

Figure 5:
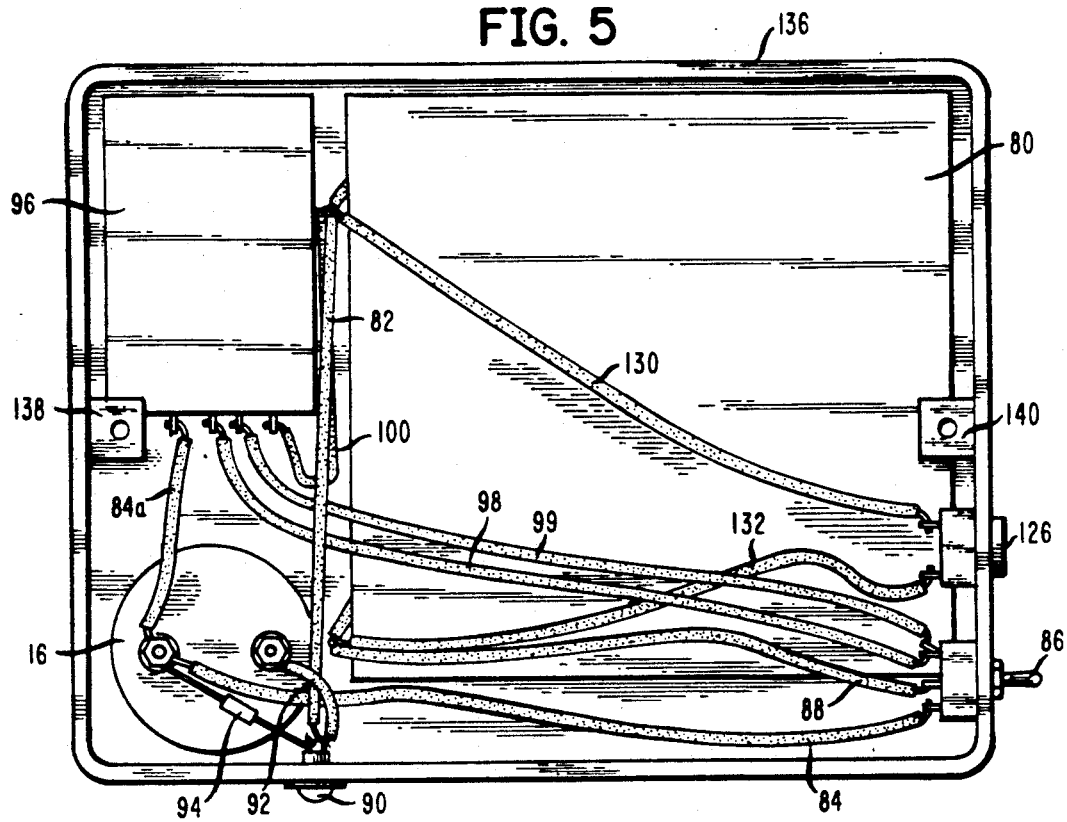
FIG. 5 is a top plan view of the wiring of aeration apparatus according to the invention.
Figure 6:
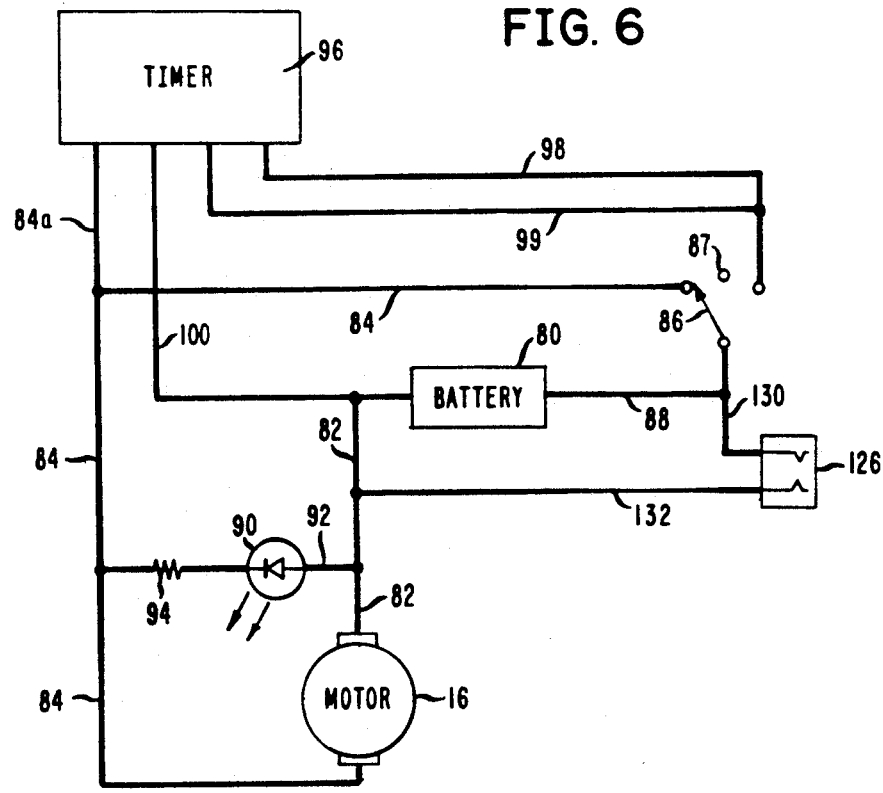
FIG. 6 is a wiring diagram.
Figure 7:
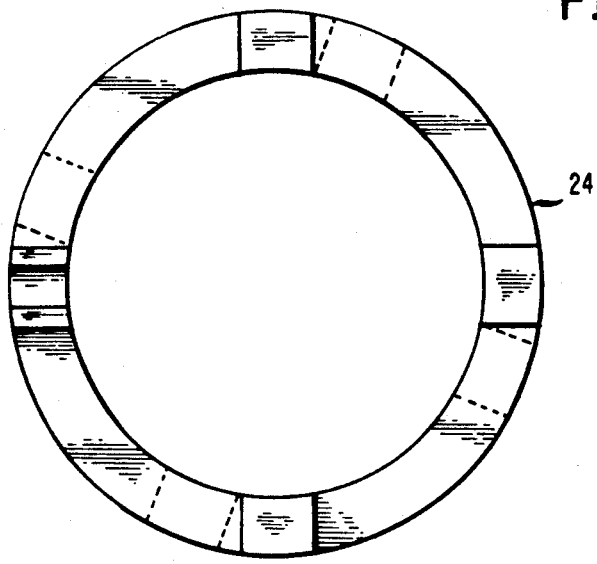
FIG. 7 is a cross section taken along line 7—7 in FIG. 2.

The manner of connection of the motor 16 and the battery 80 can be by any suitable circuit. A suitable circuit is shown in FIG. 5. 5–6. The battery 80 is connected to the motor 16 through a path 82. The motor 16 is connected by a path 84 to a power switch 86. The power switch 86 is preferably a single pole, double throw switch (on-off-on), the off position being at pole 87. A return path 88 extends from the power switch to the battery 80. The switch 86 will alternately complete or interrupt the circuit to provide operation of the motor 16. A suitable LED 90 can be provided in a path 92 parallel to the motor 16, and with a suitable limiting resistor 94, to indicate operation of the motor 16.

Water aeration apparatus according to the invention will efficiently aerate water and need not operate continuously in most applications. A timer 96 can be provided to cycle the operation of the motor 16 to periodically aerate the water and to prevent needless motor operation and energy drain from the battery 80. The timer 96 can be connected to the power switch 86 and to the battery 80 by alternate paths 98, 99. The timer 96 is connected to the battery 80 by a path 100 to complete the circuit. Positioning of the power switch 86 for timer operation will permit current flow through the path 98 to the timer electronics and, when the timer is "on", through the path 99 connecting with 84a to the motor 16.

The timer 96 can be selected from several suitable designs. In a preferred design, a timing wheel is caused to rotate by the timer electronics. Suitable circuit-closing and circuit-opening components are provided on the timing wheel. For example, magnets on the timing wheel can operate to open or close a reed switch to alternately open or close the circuit to the motor 16. Alternatively, apertures in the timing wheel can be utilized to selectively pass light to trigger a light-sensitive circuit switching mechanism. Other timing mechanisms would also be suitable.

Modifications to the circuit are possible. A jack 126 can be provided to permit recharging of the battery 80 using suitable recharging apparatus. Paths 130, 132 connect the jack 126 to the terminals of the battery 80 to permit recharging.

Portions of the aeration apparatus and circuitry can be conveniently located in a housing 136. The motor housing 50 with cap 52 can be provided within the enclosure 136. The LED 90 is also secured to the enclosure 136 so as to be readily visible to the user. Mounting brackets 138, 140 can be provided to secure the enclosure 136 to a supporting surface. The power switch 86 and jack 126 can be positioned through the enclosure 136 to provide for ready access. The battery 80 and timer 96 also are positioned within the enclosure 136. A cover lid 137 can be secured to the enclosure 136 by suitable fastening means such as screws 139, 141. A vent cap 142 can be provided to vent the enclosure 136.

Aeration apparatus according to the invention is particularly useful in bait containers of many designs and descriptions. A suitable bait container 143 is depicted in FIG. 1. The enclosure 136 is mounted to a lid 144 that is adapted to rest on a suitable support on the container 143. An access opening (not shown) is provided in the lid 144 to permit access to the bait within the container 143. An access plate 150 is provided to cover the access opening. The access plate 150 can be secured to the lid 144 by suitable structure such as hinges 152, 154. A knob 156 can be provided to raise the access plate 150. The air tube 74 can extend through a suitable aperture formed in the lid 144. The container 143 can be provided with suitable features known for such containers, including a carrying strap 160 which is mounted to the container 143 at rings 164, and by clips 166.

The invention is capable of taking several alternative forms without departing from the spirit or essential attributes thereof. Accordingly, reference should be had to the following claims, rather than to the foregoing specification, as indicating the scope of the invention.

I claim:

1. Water aeration apparatus, comprising:
a rotatable accelerator adapted to propel water, said propulsion defining a low pressure intake side and a higher pressure exhaust side, said accelerator being a propeller having at least two blades, each of said blades having a face and a back, each face and back comprising an irregular surface portion adapted to increase the turbulence of water flowing across said blades, said irregular surface being hemispherical;
motor means adapted to drive said accelerator;
an airway having an outlet at said low pressure intake side of said accelerator, whereby air will be drawn from said airway by said low pressure and will impinge upon said rotating accelerator to disburse the air into the water.

2. Water aeration apparatus, comprising:
a rotatable accelerator adapted to propel water, said propulsion defining a low pressure intake side and a higher pressure exhaust side, said accelerator being a propeller having at least two blades, said blades of said propeller each having a flat blade portion substantially perpendicular to the axis of rotation and on said intake side of said propeller;
motor means adapted to drive said accelerator;
an airway having an outlet at said low pressure intake side of said accelerator, said outlet of said airway being positioned substantially adjacent to said flat blade portions during rotation of said propeller blades, said outlet of said airway being substantially flat, elliptical, and in a plane substantially parallel to said flat blade portion of said propeller, whereby air will be drawn from said airway by said low pressure and will impinge upon said rotating accelerator to disburse the air into the water.

3. Water aeration apparatus, comprising:
a rotatable accelerator adapted to propel water, said propulsion defining a low pressure intake side and a higher pressure exhaust side, said accelerator being provided with an accelerator enclosure, said enclosure having at least one intake opening and at least one exhaust opening, said intake opening being smaller in dimension than said exhaust opening, said enclosure comprising a base plate, at least a central, major portion of said base plate being concave to deflect water leaving said exhaust side of said accelerator through said outlet openings;
motor means adapted to drive said accelerator;
an airway having an outlet at said low pressure intake side of said accelerator, whereby air will be drawn from said airway by said low pressure and will impinge upon said rotating accelerator to disburse the air into the water.

4. A bait container, said bait container comprising:
a container body adapted to retain said bait;
a rotatable accelerator adapted to propel water contained within said container, said propulsion defining a low pressure intake side and a higher pressure exhaust side of said accelerator, said accelerator being a propeller having at least two blades, said blades of said propeller comprising front and back sides, each of said blades comprising at least one irregular surface portion adapted to increase the turbulence of water flowing across said blades, said irregular surface portion being hemispherical;
motor means adapted to drive said accelerator, said motor means and said propeller being positioned within an elongated housing and substantially at opposite ends thereof, said motor means and said propeller being connected by a drive shaft;

an air supply conduit having an inlet opening adapted to receive air from the surrounding environment and an outlet opening positioned substantially adjacent to said intake side of said accelerator; and, means for positioning said accelerator within said container so as to contact water within said container.

* * * * *